US006643708B1

(12) United States Patent
Francis et al.

(10) Patent No.: US 6,643,708 B1
(45) Date of Patent: Nov. 4, 2003

(54) SYSTEMS, METHODS AND COMPUTER PROGRAM PRODUCTS FOR CHAINING JAVA SERVLETS ACROSS NETWORKS

(75) Inventors: Arthur R. Francis, Apex, NC (US); Donald Washburn, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,617

(22) Filed: Oct. 29, 1998

(51) Int. Cl.⁷ ............................................... G06F 15/16
(52) U.S. Cl. ........................................ 709/246; 709/311
(58) Field of Search ............................. 709/1, 100–108, 709/200–253, 310–332

(56) References Cited

U.S. PATENT DOCUMENTS 5,928,323 A  *  7/1999  Gosling et al. ............. 709/203
6,012,098 A  *  1/2000  Bayeh et al. ............... 709/246

OTHER PUBLICATIONS

"The Essentials of Filters", http://java.sun.com/products/servlet.*
"Java Remote Method Invocation Specification" Sun Microsystems Inc. Feb. 10, 1997 pp. 15–21.*
IBM Corporation, *ServletExpress, Webmaster's Guide*, Version 1.0, Dec. 1997.
The Java Servlet API, http://cristi.nada.kth.se:8080/system/doc/servlets/api.htlm 1, Jul. 15, 1998.

* cited by examiner

*Primary Examiner*—St. John Courtenay, III
*Assistant Examiner*—Charles Anya
(74) *Attorney, Agent, or Firm*—Myers, Bigel, Sibley & Sajovec; A. Bruce Clay, Esq.

(57) ABSTRACT

Systems, methods and computer program products are provided for using fully qualified universal resource locators (URLs) to chain together servlets across multiple remotely located Java® Virtual Machines (JVMs) in a network in order to implement application partitioning across the network. Each servlet in a chain is configured to perform a respective processing task using a response from a preceding servlet in the chain. A fully qualified URL includes an identification of a host computer, an identification of a filter within the host computer, and an identification of a servlet residing within the host computer.

24 Claims, 3 Drawing Sheets

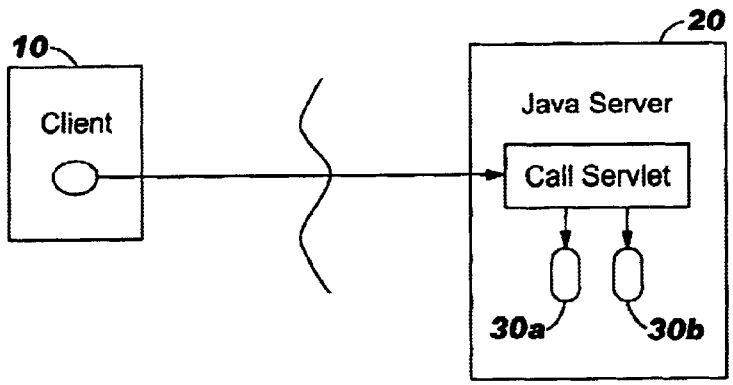
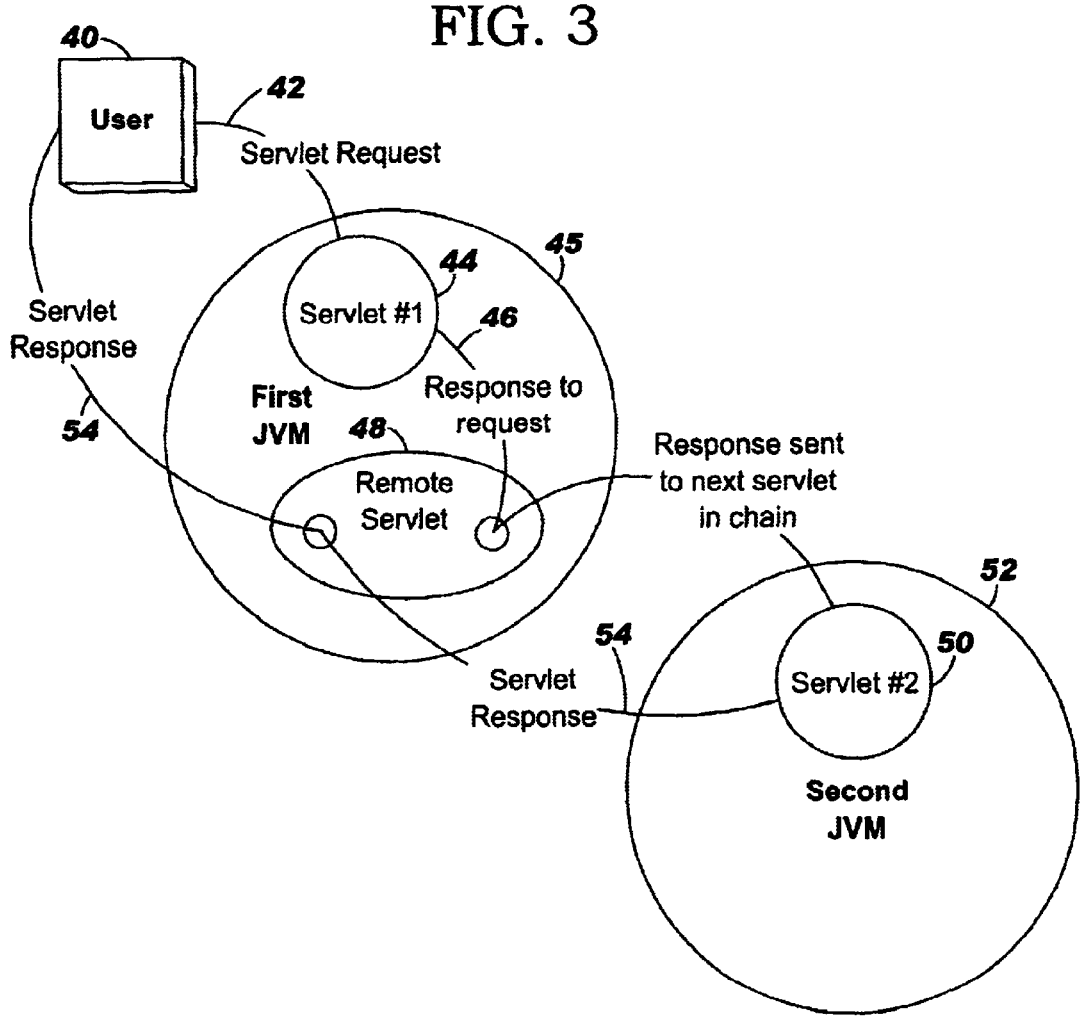

FIG. 4A
FIG. 4B
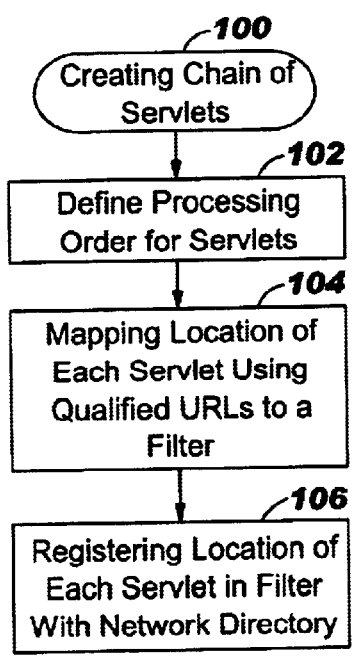
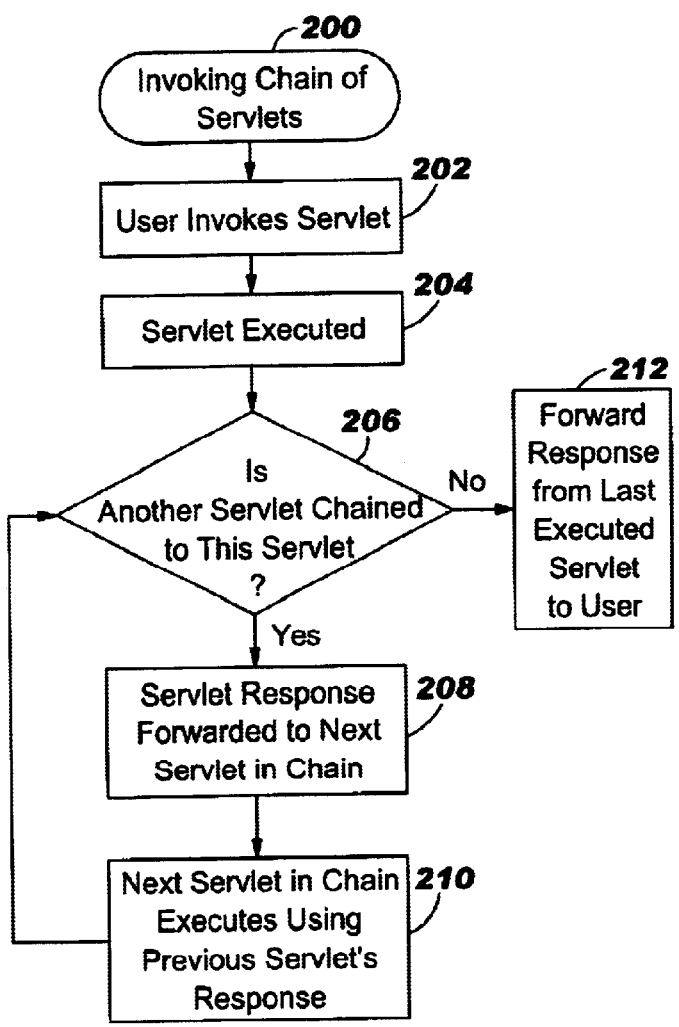

SYSTEMS, METHODS AND COMPUTER PROGRAM PRODUCTS FOR CHAINING JAVA SERVLETS ACROSS NETWORKS

FIELD OF THE INVENTION

The present invention relates generally to computer networks and, more particularly, to the partitioning of data processing applications in computer networks.

BACKGROUND OF THE INVENTION

Increasingly, data processing operations on an enterprise level are being performed using partitioned applications. Application partitioning allows various components of an application to be separated out and distributed across a network. Application partitioning also can facilitate efficient use of resources by dedicating hardware and software to specific tasks. In addition, by separating application components according to functionality, data integrity and scalability can be enhanced.

Increasing interest is being shown in application partitioning across the Internet and, particularly, the World Wide Web (Web). Various efforts are underway to enhance Web browsers, develop Web applications, and improve database connectivity and object management via the Web. Such efforts have produced the Java® object oriented programming language and various specifications for passing objects around a network, such as Internet Inter-ORB Protocol (IIOP) and Common Object Request Broker Architecture (CORBA).

Although methods, such as CORBA and IIOP exist for invoking applications across a network of servers, such methods may require significant system resources to set up the environment within which these applications can be invoked. For example, skeletons and stubs are typically built and stored within server hosting machines and client hosting machines, respectively. In addition, existing methods for invoking applications across a network of servers are generally geared towards object passing that may require the use of complex interface definition language (IDL) compilers to generate a client/server interface.

Java® is an object-oriented programming language developed by Sun Microsystems, Mountain View, Calif. Java® is a portable and architecturally neutral language. Java® source code is compiled into a machine-independent format that can be run on any machine with a Java® runtime system known as the Java® Virtual Machine (JVM). The JVM is defined as an imaginary machine that is implemented by emulating a processor through the use of software on a real machine. Accordingly machines running under diverse operating systems, including UNIX, Windows NT, and MacIntosh having a JVM can execute the same Java® program.

Servlets are Java® applications that have been developed to extend the functionality of Web servers. Servlets may be referred to as server-side applets or applications. Similar to the way Java® applets run on a browser and extend a browser's capabilities, servlets run on a JVM on a host computer, such as a Web server.

A servlet enhances a Web server by enabling client-server services. When a client computer sends a request to a Web server, the Web server can send the request information to a servlet and have the servlet construct the response that the Web server sends back to the client computer. In addition, a servlet can be loaded automatically when a Web server is started, or a servlet can be loaded the first time a client computer requests the services of a servlet. After loading, a servlet typically continues to run, waiting for additional client requests.

Servlets can be significant because they can dynamically extend the function of the host computer. As is known to those skilled in this art, servlets are advantageous because a servlet is running in the context of a server process on a host computer. This can save time and effort otherwise needed to create a common gateway interface (CGI) process to serve an incoming request. Furthermore, because servlets are written in Java®, complicated, cross-platform Web applications can be created without having to create multiple versions of each application.

Servlets having similar computer resource requirements are conventionally organized together within a single JVM. For example, a first group of servlets may require a lot of memory resources from a server, while a second group of servlets may require database connectivity. Accordingly, the first group of servlets are preferably located within a JVM running on a host computer having sufficient memory resources. The second group of servlets are preferably located within another JVM running on a separate host computer having database connectivity resources.

One or more servlets can be invoked in sequence within a JVM by creating a servlet chain and then invoking the first servlet in the chain. In a servlet chain, the first servlet receives a request and sends its response to the next servlet in the chain. The last servlet in the chain sends its response to the user. Unfortunately, servlets can be chained together only within a single JVM. As a result, the present inability to chain servlets across different multiple JVMs, may severely limit application partitioning across the Internet and other Web-based networks.

SUMMARY OF THE INVENTION

In view of the above discussion, it is an object of the present invention to facilitate application partitioning across the Internet and other Web-based networks.

It is another object of the present invention to facilitate the chaining of servlets across separate JVMs.

These and other objects of the present invention are provided by systems, methods and computer program products for using fully qualified universal resource locators (URLs) to chain together servlets across multiple remotely located JVMs in a network in order to implement application partitioning across the network. Each servlet in a chain is configured to perform a respective processing task using a response from a preceding servlet in the chain. A fully qualified URL includes an identification of a host computer, an identification of a filter within the host computer, and an identification of a servlet residing within the host computer.

Steps for creating a chain of remotely located servlets include defining an order in which each servlet in the chain is to perform a respective processing task, and then mapping a location of each servlet within the chain to a filter within each respective host computer. Each servlet location is then registered with a network directory, such as a Lightweight Directory Access Protocol directory, that is accessible by each host computer.

A chain of remotely located servlets may be invoked by a user, according to the present invention, by invoking a first servlet located within a first host computer to perform a first processing task. A filter within the first host computer examines a fully qualified universal resource locator (URL) used to invoke the first servlet to determine whether one or more additional servlets are chained to the first servlet. Upon determining that one or more additional servlets are chained to the first servlet, a second servlet in the chain, typically residing within a second host computer, is invoked to perform a second processing task using a response produced by the first servlet. A filter within the second host computer examines a fully qualified universal resource locator (URL) used to invoke the second servlet and determines whether one or more additional servlets are chained to the second servlet. Upon determining that no additional servlets are chained to the second servlet, a response produced by the second servlet is forwarded to a user. Alternatively, the response produced by the second servlet can be forwarded to the user via the first host computer.

The above process may continue for any additional servlets in the chain. For example, upon determining that one or more additional servlets are chained to the second servlet, a third servlet in the chain, residing within a third host computer, is invoked to perform a third processing task using a response produced by the second servlet. A filter within the third host computer examines the fully qualified universal resource locator (URL) used to invoke the third servlet and determines whether one or more additional servlets are chained to the third servlet. Upon determining that no additional servlets are chained to the third servlet, a response produced by the third is forwarded to the user.

According to the present invention, application partitioning can be accomplished by deploying groups of servlets locally and globally across many JVMs. The present invention is particularly advantageous because portions of an application implemented via servlets can reside on multiple JVMs. The present invention can facilitate code reuse because a servlet can belong to one or more groups of servlets. Furthermore, "on-the-fly" updates to applications can be accomplished more readily because the present invention allows portions of an application that consist of multiple servlets to be modified or updated without impacting other servlets or servlet components.

Servlet chaining across a network, according to the present invention, facilitates tying partitioned servlet components residing across clusters of servers to produce functional applications. Using servlet chaining, according to the present invention, implementation and configuration of distributed servlets is native to a JVM.

With conventional servlet chaining, results from servlets within a single host computer are returned to a user. However, the present invention allows the results from multiple servlets within multiple JVMs to be chained together, even without a user knowing that multiple servlets are being utilized.

BRIEF DESCRIPTION OF THE DRAWINGS

FIG. 2 schematically illustrates a client making a server request whereupon the server invokes a servlet.

FIG. 3 schematically illustrates the chaining together of servlets across a network, according to the present invention.

FIG. 4A schematically illustrates operations for creating a chain of remotely located servlets, according to the present invention.

FIG. 4B schematically illustrates operations for invoking a chain of remotely located servlets, according to the present invention.

DETAILED DESCRIPTION OF THE INVENTION

Figure 1:
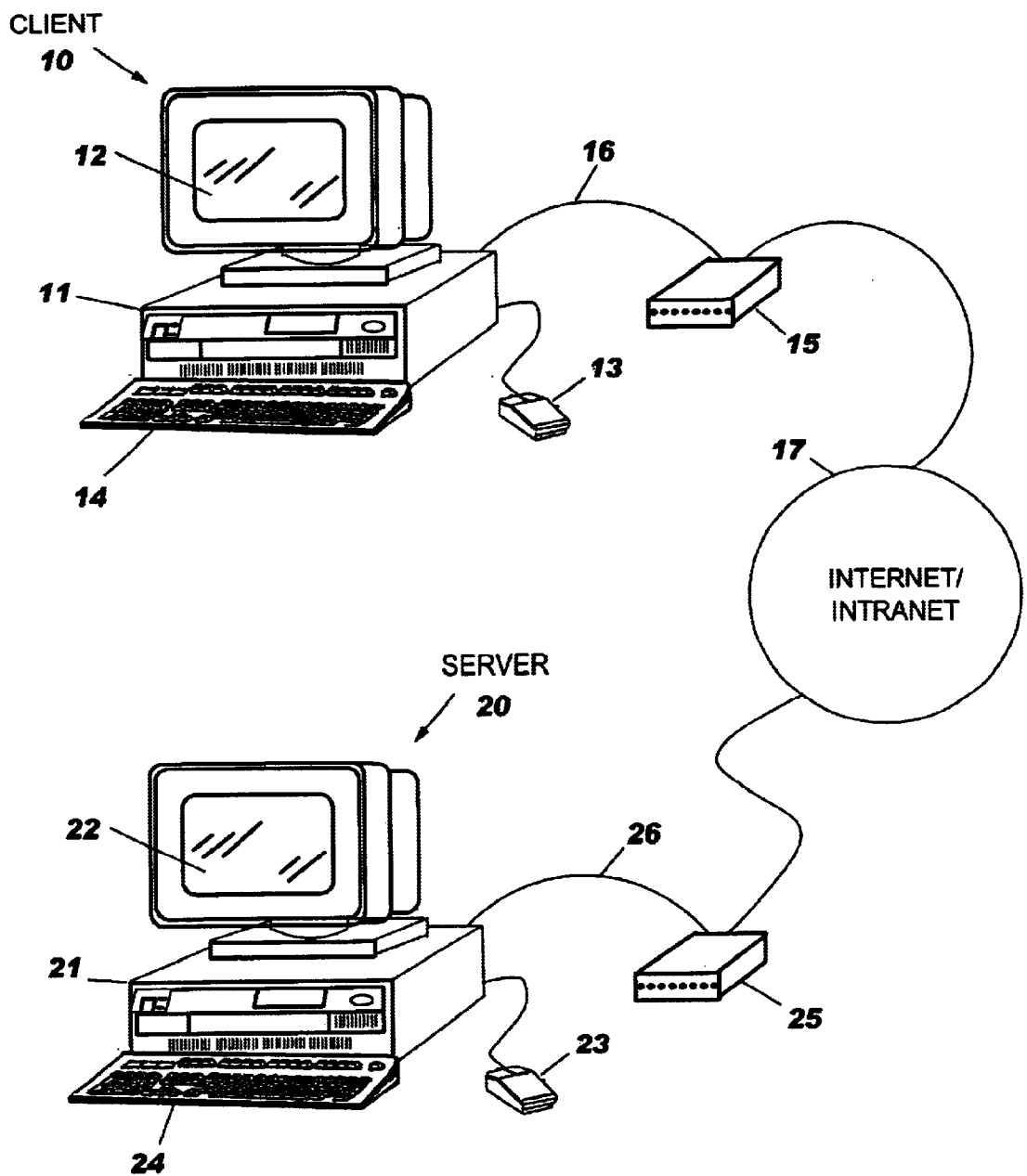
FIG. 1 illustrates a basic client-server environment in which the present invention may be utilized.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Client-Server Communications

The paradigm for the Internet is that of a client-server relationship where clients communicate with servers. As is known to those with skill in this art, a client is the requesting program in a client-server relationship. A server awaits and fulfills requests from clients in the same or other computers. A given application in a computer may function as a client with requests for services from other programs and a server of requests from other programs.

In the context of Web client-server applications, a client may be a Web browser which acts as a user interface. A Web browser sends user requests to an appropriate Web server and formats and displays Hyper Text Markup Language (HTML) data (i.e., the response) returned from the Web server. A Web browser also evaluates the HTML data to determine if there are any embedded hyper-link statements in the HTML data which would require subsequent browser requests which would then be initiated by the browser. A Web server acts as the server for the client and processes the Web browsers requests and returns the requested response as an HTML data portion of a Hyper Text Transfer Protocol (HTTP) data stream.

Referring now to FIG. 1, a basic client-server environment within which the present invention may be incorporated is depicted. As is known to those with skill in the art, client-server environments may include public networks, such as the Internet, and private networks often referred to as "intranets", local area networks (LANs) and wide area networks (WANs). Hereinafter, all references to servlets shall include servlets residing on host computers connected to the Internet, to an intranet, and to LANs and WANs. The term "Internet" shall incorporate the term "intranet" and any references to accessing the Internet shall be understood to mean accessing an intranet and LANs and WANs, as well. Hereinafter, the term "computer network" shall incorporate publicly accessible computer networks and private computer networks.

As illustrated in FIG. 1, users may access a host computer (such as a Web server) 20 via a client computer 10. Exemplary client computers 10 may include, but are not limited to, Apple®, Sun Microsystems®, IBM®, or IBM-compatible personal computers. A client computer 10, however, may be any type of device that can make requests to a host computer including, but not limited to, an IBM® 3270 terminal, a network computer (NC), and a network PC (Net PC).

A client computer 10 may include a central processing unit 11, a display 12, a pointing device 13, a keyboard 14, access to persistent data storage, and an Internet connection 16 for connecting to the Internet 17. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP") or the Internet connection 16 may be made by a direct connection of the client computer 10 to the Internet or indirectly via another device connected to the Internet. In the latter case, the client computer 10 is typically connected to this device via a LAN or WAN.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client computer 10 and a host computer 20 (described in detail below) to store various data transferred from the server.

A host computer 20 may have a configuration similar to that of a client computer 10 and may include a central processing unit 21, a display 22, a pointing device 23, a keyboard 24, access to persistent data storage, and an Internet connection 26 for connecting to the Internet 17 via a modem 25, or otherwise. It is preferable that a host computer have an Intel® Pentium® processor or equivalent. However, a host computer 20 may be implemented using other processors and via other computing devices, including, but not limited to, mainframe computing systems and mini-computers. To execute servlets, the host computer 20 has JVM running thereon.

A user accesses a host computer 20 (such as a Web server) by establishing a TCP connection between the client computer 10 and the host computer 20. For the majority of Internet communications, a client computer communicates with a host computer using HTTP protocol over the TCP connection. The data transferred between the client computer and the host computer are HTTP data objects (e.g. HTML data). A host computer may be a proxy that receives requests from a number of client computers and routes the requests to the appropriate host computer.

A host computer 20 typically has an HTTP daemon that forwards client requests to various server applications for processing, as appropriate. These server applications may be either local or remote to the host computer 20. When a client request for server application processing is received by a host computer 20, the HTTP daemon for the Web server 20 dispatches a request to the appropriate server application. The HTTP daemon listens for a reply from the server application and then sends the reply from the server application to the requesting client computer.

Servlets

FIG. 2 schematically illustrates a client computer 10 making a request to a host computer 20. In response, the host computer 20 invokes first and second servlets 30a, 30b residing therein. Because servlets run inside a JVM within a host computer, servlets typically do not need a graphical user interface. As is known to those skilled in this art, servlets use classes and methods in the JavaSoft Java® Servlet Application Programming Interface (API). The JavaSoft Java® Servlet Application Programming Interface (API) is described in IBM's ServletExpress Webmaster's Guide, Version 1, December 1997, which is incorporated herein by reference in its entirety. A particularly preferred Web server for implementing and running servlets is the IBM WebSphere Application Server.

A servlet is invoked by calling the servlet with a URL with "/servlet/" prepended to the servlet name. For example, a client invokes a servlet with a URL of the form: http://server_host_name/servlet/<servlet URL> where the <servlet URL> is a regular URL that points to the location of the servlet. The host where a servlet resides might be different from the host where the Java® server is running. In this case the servlet class will be dynamically downloaded to the Java® server, instantiated and then run. This invocation is useful because the browser does not need any special understanding of servlets.

Chaining Servlets Across Multiple JVMs

According to the present invention, servlet chaining across multiple JVMs can be accomplished. To implement servlet chaining across a network, a Java® server is modified to accept a fully qualified URL as an entry in the servlet chain configuration. In addition to identifying a servlet to be invoked, a fully qualified URL includes an identification of the protocol (i.e., http) within which a servlet invocation is being made, and an identification of a host computer within which the servlet resides. A fully qualified URL also includes an identification of a filter within a host computer that is configured to determine whether an invoked servlet is part of a chain of servlets. An exemplary "fully qualified servlet URL may be, for example, http://myserver/servlet/SnoopServlet, wherein "http://myserver" identifies the protocol and host computer within which the invoked servlet resides, wherein "servlet" identifies the filter within the host computer, and wherein "SnoopServlet" identifies the servlet to be invoked.

When a Java® server encounters a fully qualified servlet URL in a servlet chain, the Java® server will proxy the request data to a servlet executing on another host computer, and then pipe the response from the remote servlet back to the Java® server. The target host computer is specified by the hostname in the fully qualified URL.

One or more servlets can be invoked in sequence by creating a servlet chain and then invoking the first servlet in the chain. In a servlet chain, the first servlet receives a request and sends a response to the next servlet in the chain. The last servlet in the chain sends its response to a user. A downstream servlet's request stream is essentially a pipe from an upstream servlet's response stream.

A servlet chain can be created by defining a servlet alias for a sequence of servlets, or by using multi-purpose Internet mail extension (MIME) types to trigger each servlet in a sequence. Both local and remote servlets can be part of a chain. Servlets in a servlet chain can also be aliased to one alias name. When a request arrives for that alias, all the servlets in the chain will be invoked.

Referring to FIG. 3 invoking chained servlets across multiple JVMs, according to the present invention is schematically illustrated. A user 40 makes a servlet request 42 which invokes a first servlet 44 in a chain. The first servlet 44 is located within a first JVM 45. A filter has been previously defined to notify the JVM to forward the response 46 of the first servlet 44 to a servlet instance 48 of the next servlet in the chain.

A filter is a program or section of code that is designed to examine each input or output request for certain qualifying criteria and then process or forward the request accordingly. A filter used in accordance with the present invention resides within each JVM of each host computer. Each filter takes a fully qualified URL used to invoke a servlet and determines whether the invoked servlet is part of a chain of servlets. If a chain is identified, the filter lets the JVM know that a chain exists. Accordingly, the JVM can pipe the response from a servlet operating within the JVM to another servlet resident within a different host computer running a separate JVM. In the illustrated embodiment, the servlet instance 48 is an instance of the second servlet 50 in the chain.

The remote servlet instance 48 forwards the response 46 from the first servlet 44, located within the first JVM 45, to the next servlet in the chain. In the illustrated embodiment, the next servlet in the chain is the second servlet 50 located within a second JVM 52. The entries in the chain contain a fully qualified path of each target servlet which includes the hostname of the host computer.

The second servlet 50 processes the response data from the first servlet 44 and produces a response 54. The response 54 from the second servlet 50 is then piped back to the instance of the second servlet 48 within the first JVM 45. The instance of the second servlet 48 then forwards the response 54 of the second servlet 50 to the user 40, as illustrated.

In the illustrated embodiment of FIG. 3, the invoked chain contains two servlets, each residing within different host computers having separate JVMs. However, it is to be understood that the present invention may be utilized for servlet chains having any number of servlets located within any number of separate host computers having separate JVMs. Referring now to FIG. 4A, operations for creating a chain of remotely located servlets (Block 100), according to the present invention, are schematically illustrated. The order in which each servlet in a chain is to perform a respective processing task is defined (Block 102). Next, a location of each servlet within the chain is mapped to a filter within each host computer (Block 104). The location of each servlet is then registered with a network directory accessible by each host computer (Block 106).

A network directory identifies where something is located in the network. On TCP/IP networks (including the Internet), the Domain Name System (DNS) is a directory system that relates domain names to a specific network address (a unique location on the network). A preferred directory within which the location of each servlet within a chain can be registered is a Lightweight Directory Access Protocol (LDAP) directory. LDAP is an emerging software protocol for enabling anyone to locate organizations, individuals, and other resources such as files and devices in a network, whether on the Internet or on a corporate intranet.

LDAP is a "lightweight" (smaller amount of code) version of DAP (Directory Access Protocol), which is part of X.500, a standard for directory services in a network. An LDAP directory can be distributed among many host computers. Each host computer can have a replicated version of the total directory that is synchronized periodically. The current LDAP specification can be found in the Network Working Group Request for Comments (RFC) 1777 (http://idm.internet.com/ RFC/rfc-1777.html), which is incorporated herein by reference in its entirety.

Referring now to FIG. 4B, operations for invoking a chain of servlets residing within remotely located host computers (Block 200), according to the present invention, are illustrated. A user invokes a servlet to perform a processing task (Block 202). As the first servlet executes (Block 204), a filter within the host computer of the servlet determines whether another servlet is chained to this servlet (Block 206). If the servlet is not part of a chain, the response from the servlet is returned to the user (Block 212). If the servlet is a part of a chain, the Java servlet engine within the JVM of the host computer forwards the servlet response to the next servlet in the chain located on a second host computer running a separate JVM (Block 208). The second servlet in the chain then executes using the response from the previous servlet (Block 210). A filter within the second host computer determines whether another servlet is chained to the second servlet (Block 206). If the servlet is not part of a chain, the response from the last servlet to execute (i.e., in this case the second servlet) is returned to the user (Block 212). This procedure for determining if additional servlets are chained to the current servlet can be repeated for any number of servlets within a chain.

It will be understood that each block of the flowchart illustrations of FIGS. 4A–4B and combinations of blocks in the flowchart illustrations of FIGS. 4A–4B, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of creating a chain of servlets, wherein each servlet in the chain is configured to perform a respective processing task using a response from a preceding servlet in the chain, wherein each servlet in the chain resides within a different respective host computer in communication with a network, and wherein a Java® Virtual Machine (JVM) is implemented within each host computer, the method comprising the steps of:

defining an order in which each servlet in the chain is to perform a respective processing task, wherein each servlet in the chain resides within a different respective host computer, and wherein each servlet in the chain performs its respective processing task within its respective host computer;

mapping a location of each servlet within the chain to a filter within each host computer; and registering the location of each servlet with a network directory accessible by each host computer.

2. A method according to claim 1 wherein the step of mapping a location of each servlet to a filter within each host computer comprises defining a qualified uniform resource locator for each servlet, wherein the qualified uniform resource locator comprises:

an identification of a host computer;

an identification of a filter within the host computer; and an identification of a servlet residing within the host computer.

3. A method according to claim 1 wherein the step of registering each servlet location comprises registering each servlet location with a network directory service.

4. A method according to claim 3 wherein the network directory service comprises Lightweight Directory Access Protocol.

5. A method of invoking a chain of servlets, wherein each servlet in the chain is configured to perform a respective processing task using a response from a preceding servlet in the chain, wherein each servlet in the chain resides within a different respective host computer in communication with a network, and wherein a Java® Virtual Machine (JVM) is implemented within each host computer, the method comprising the steps of:

invoking a first servlet to perform a first processing task, wherein the first servlet resides within a first host computer and performs the first processing task within the first host computer;

determining, via a filter within the first host computer that examines a fully qualified universal resource locator (URL) used to invoke the first servlet, whether one or more additional servlets are chained to the first servlet;

invoking a second servlet in the chain to perform a second processing task using a response produced by the first servlet upon determining that one or more additional servlets are chained to the first servlet, wherein the second servlet resides within a second host computer and performs the second processing task within the second host computer;

determining, via a filter within the second host computer that examines a fully qualified universal resource locator (URL) used to invoke the second servlet, whether one or more additional servlets are chained to the second servlet; and forwarding a response produced by the second servlet to a user upon determining that no additional servlets are chained to the second servlet.

6. A method according to claim 5 wherein the step of forwarding a response produced by the second servlet to a user comprises forwarding the response to the user via the first host computer.

7. A method according to claim 5 further comprising the steps of:

invoking a third servlet in the chain to perform a third processing task using a response produced by the second servlet upon determining that one or more additional servlets are chained to the second servlet, wherein the third servlet resides within a third host computer and performs the third processing task within the third host computer;

determining, via a filter within the third host computer that examines a fully qualified universal resource locator (URL) used to invoke the third servlet, whether one or more additional servlets are chained to the third servlet; and forwarding a response produced by the third servlet to a user upon determining that no additional servlets are chained to the third servlet.

8. A method according to claim 7 wherein the step of forwarding a response produced by the third servlet to a user comprises forwarding the response to the user via the second and first host computers, respectively.

9. A system for creating a chain of servlets, wherein each servlet in the chain is configured to perform a respective processing task using a response from a preceding servlet in the chain, wherein each servlet in the chain resides within a different respective host computer in communication with a network, and wherein a Java® Virtual Machine (JVM) is implemented within each host computer, comprising:

means for defining an order in which each servlet in the chain is to perform a respective processing task, wherein each servlet in the chain resides within a different respective host computer, and wherein each servlet in the chain performs its respective processing task within its respective host computer;

means for mapping a location of each servlet within the chain to a filter within each host computer; and means for registering the location of each servlet with a network directory accessible by each host computer.

10. A system according to claim 9 wherein the means for mapping a location of each servlet to a filter within each host computer comprises means for defining a qualified uniform resource locator for each servlet, wherein the qualified uniform resource locator comprises:

an identification of a host computer;

an identification of a filter within the host computer; and an identification of a servlet residing within the host computer.

11. A system according to claim 9 wherein the means for registering each servlet location comprises means for registering each servlet location with a network directory service.

12. A system according to claim 11 wherein the network directory service comprises Lightweight Directory Access Protocol.

13. A system of invoking a chain of servlets, wherein each servlet in the chain is configured to perform a respective processing task using a response from a preceding servlet in the chain, wherein each servlet in the chain resides within a different respective host computer in communication with a network, and wherein a Java® Virtual Machine (JVM) is implemented within each host computer, comprising:

means for invoking a first servlet to perform a first processing task, wherein the first servlet resides within a first host computer and performs the first processing task within the first host computer;

means for determining, via a filter within the first host computer that examines a fully qualified universal resource locator (URL) used to invoke the first servlet, whether one or more additional servlets are chained to the first servlet;

means for invoking a second servlet in the chain to perform a second processing task using a response produced by the first servlet upon determining that one or more additional servlets are chained to the first servlet, wherein the second servlet resides within a second host computer and performs the second processing task within the second host computer;

means for determining, via a filter within the second host computer that examines a fully qualified universal resource locator (URL) used to invoke the second servlet, whether one or more additional servlets are chained to the second servlet; and means for forwarding a response produced by the second servlet to a user upon determining that no additional servlets are chained to the second servlet.

14. A system according to claim 13 wherein the means for forwarding a response produced by the second servlet to a user comprises means for forwarding the response to the user via the first host computer.

15. A system according to claim 13 further comprising:

means for invoking a third servlet in the chain to perform a third processing task using a response produced by the second servlet upon determining that one or more additional servlets are chained to the second servlet, wherein the third servlet resides within a third host computer and performs the third processing task within the third host computer;

means for determining, via a filter within the third host computer that examines a fully qualified universal resource locator (URL) used to invoke the third servlet, whether one or more additional servlets are chained to the third servlet; and means for forwarding a response produced by the third servlet to a user upon determining that no additional servlets are chained to the third servlet.

16. A system according to claim 15 wherein the means for forwarding a response produced by the third servlet to a user comprises means for forwarding the response to the user via the second and first host computers, respectively.

17. A computer program product for creating a chain of servlets, wherein each servlet in the chain is configured to perform a respective processing task using a response from a preceding servlet in the chain, wherein each servlet in the chain resides within a different respective host computer in communication with a network, and wherein a Java® Virtual Machine (JVM) is implemented within each host computer, the computer program product comprising a computer usable storage medium having computer readable program code means embodied in the medium, the computer readable program code means comprising:

computer readable program code means for defining an order in which each servlet in the chain is to perform a respective processing task, wherein each servlet in the chain resides within a different respective host computer, and wherein each servlet in the chain performs its respective processing task within its respective host computer;

computer readable program code means for mapping a location of each servlet within the chain to a filter within each host computer; and computer readable program code means for registering the location of each servlet with a network directory accessible by each host computer.

18. A computer program product according to claim 17 wherein the computer readable program code means for mapping a location of each servlet to a filter within each host computer comprises computer readable program code means for defining a qualified uniform resource locator for each servlet, wherein the qualified uniform resource locator comprises:

an identification of a host computer;

an identification of a filter within the host computer; and an identification of a servlet residing within the host computer.

19. A computer program product according to claim 17 wherein the computer readable program code means for registering each servlet location comprises computer readable program code means for registering each servlet location with a network directory service.

20. A computer program product according to claim 19 wherein the network directory service comprises Lightweight Directory Access Protocol.

21. A computer program product for invoking a chain of servlets, wherein each servlet in the chain is configured to perform a respective processing task using a response from a preceding servlet in the chain, wherein each servlet in the chain resides within a different respective host computer in communication with a network, and wherein a Java® Virtual Machine (JVM) is implemented within each host computer, the computer program product comprising a computer usable storage medium having computer readable program code means embodied in the medium, the computer readable program code means comprising:

computer readable program code means for invoking a first servlet to perform a first processing task, wherein the first servlet resides within a first host computer and performs the first processing task within the first host computer;

computer readable program code means for determining, via a filter within the first host computer that examines a fully qualified universal resource locator (URL) used to invoke the first servlet, whether one or more additional servlets are chained to the first servlet;

computer readable program code means for invoking a second servlet in the chain to perform a second processing task using a response produced by the first servlet upon determining that one or more additional servlets are chained to the first servlet, wherein the second servlet resides within a second host computer and performs the second processing task within the second host computer;

computer readable program code means for determining, via a filter within the second host computer that examines a fully qualified universal resource locator (URL) used to invoke the second servlet, whether one or more additional servlets are chained to the second servlet; and computer readable program code means for forwarding a response produced by the second servlet to a user upon determining that no additional servlets are chained to the second servlet.

22. A computer program product according to claim 21 wherein the computer readable program code means for forwarding a response produced by the second servlet to a user comprises computer readable program code means for forwarding the response to the user via the first host computer.

23. A computer program product according to claim 21 further comprising:

computer readable program code means for invoking a third servlet in the chain to perform a third processing task using a response produced by the second servlet upon determining that one or more additional servlets are chained to the second servlet, wherein the third servlet resides within a third host computer and performs the third processing task within the third host computer;

computer readable program code means for determining, via a filter within the third host computer that examines a fully qualified universal resource locator (URL) used to invoke the third servlet, whether one or more additional servlets are chained to the third servlet; and computer readable program code means for forwarding a response produced by the third servlet to a user upon determining that no additional servlets are chained to the third servlet.

24. A computer program product according to claim 23 wherein the computer readable program code means for forwarding a response produced by the third servlet to a user comprises computer readable program code means for forwarding the response to the user via the second and first host computers, respectively.

* * * * *